United States Patent
Imamura et al.

(10) Patent No.: US 11,433,817 B2
(45) Date of Patent: Sep. 6, 2022

(54) DISPLAY APPARATUS

(71) Applicant: Panasonic Intellectual Property Management Co., Ltd., Osaka (JP)

(72) Inventors: Norihiro Imamura, Osaka (JP); Shigeru Furumiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

(21) Appl. No.: 17/230,618

(22) Filed: Apr. 14, 2021

(65) Prior Publication Data

US 2021/0354626 A1 Nov. 18, 2021

(30) Foreign Application Priority Data

May 12, 2020 (JP) .............................. JP2020-083753
Nov. 10, 2020 (JP) .............................. JP2020-187219

(51) Int. Cl.
*B60R 1/12* (2006.01)
*G02B 5/30* (2006.01)
(Continued)

(52) U.S. Cl.
CPC .............. *B60R 1/12* (2013.01); *G02B 5/3083* (2013.01); *G02B 27/283* (2013.01);
(Continued)

(58) Field of Classification Search
CPC . B60R 1/12; B60R 2001/1215; G02B 5/3083; G02B 27/283; G02B 27/286;
(Continued)

(56) References Cited

U.S. PATENT DOCUMENTS

2017/0045738 A1* 2/2017 Kim .................... G02B 5/30
2017/0235136 A1* 8/2017 Kim .................... G02B 5/30
359/485.07
(Continued)

FOREIGN PATENT DOCUMENTS

JP 07-179141 7/1995
JP 09-508477 8/1997
(Continued)

OTHER PUBLICATIONS

Official Action issued in Japanese Patent Application JP2020-187219 dated Oct. 5, 2021, along with English translation.

*Primary Examiner* — Ricky D Shafer
(74) *Attorney, Agent, or Firm* — Greenblum & Bernstein, P.L.C.

(57) ABSTRACT

A display apparatus includes a first mirror and a half mirror between a display device and a concave mirror. The first mirror reflects emission light emitted from an elongate display surface of the display device, toward the half mirror. The half mirror reflects the light reflected by the first mirror, toward the concave mirror. The concave mirror reflects the light reflected by the half mirror, toward the half mirror. In a top view of the display apparatus, a line passing through a center of the display surface in a longitudinal direction and parallel to the longitudinal direction and a tangent line passing through a center of a reflection surface of the concave mirror in a longitudinal direction and parallel to the longitudinal direction intersect at a predetermined angle.

4 Claims, 5 Drawing Sheets

(51) Int. Cl.
    *G02F 1/13363*     (2006.01)
    *G02B 27/28*       (2006.01)
    *G02F 1/1335*      (2006.01)

(52) U.S. Cl.
    CPC ..... *G02B 27/286* (2013.01); *G02F 1/133553* (2013.01); *G02F 1/133638* (2021.01); *B60R 2001/1215* (2013.01); *G02F 2413/02* (2013.01)

(58) Field of Classification Search
    CPC ......... G02F 1/133536; G02F 1/133553; G02F 1/133557; G02F 1/133638; G02F 2413/02
    USPC ...................................... 359/485.07, 489.07
    See application file for complete search history.

(56) References Cited

U.S. PATENT DOCUMENTS

| | | | |
|---|---|---|---|
| 2017/0269428 A1* | 9/2017 | Otani | G02B 6/0055 |
| 2017/0357088 A1* | 12/2017 | Matsuzaki | G02B 6/3516 |
| 2018/0157036 A1* | 6/2018 | Choi | G06T 19/006 |
| 2018/0345860 A1* | 12/2018 | Imamura | G02B 27/0025 |
| 2019/0255946 A1* | 8/2019 | Takahashi | G02B 17/0668 |
| 2020/0012099 A1* | 1/2020 | Kim | G02B 27/0101 |
| 2020/0070729 A1* | 3/2020 | Imamura | B60R 1/07 |
| 2020/0377021 A1* | 12/2020 | So | B60R 1/12 |
| 2021/0197725 A1* | 7/2021 | Imamura | B60R 1/08 |
| 2022/0004013 A1* | 1/2022 | Nagatomi | G02B 27/14 |

FOREIGN PATENT DOCUMENTS

| | | |
|---|---|---|
| JP | 2017-210229 | 11/2017 |
| WO | 95/21391 | 8/1995 |

\* cited by examiner

DISPLAY APPARATUS

CROSS REFERENCE TO RELATED APPLICATIONS

The present application is based on and claims priority of Japanese Patent Application No. 2020-083753 filed on May 12, 2020 and Japanese Patent Application No. 2020-187219 filed on Nov. 10, 2020.

FIELD

The present disclosure relates to a display apparatus for displaying image information.

BACKGROUND

A vehicular display apparatus (display system) including a rear camera, a monitor, and a concave mirror is conventionally disclosed (for example, see PTL 1). The rear camera captures the rear of the vehicle. The monitor is located at a ceiling position between the driver's seat and the front passenger seat in the vehicle interior, and projects a vehicle rear image based on vehicle rear video data from the rear camera. The concave mirror is installed at a position in the upper part of the windshield in the vehicle interior, and reflects the monitor image to show the vehicle rear image to a vehicle occupant.

CITATION LIST

Patent Literature

PTL 1: Japanese Unexamined Patent Application Publication No. 2017-210229

SUMMARY

The vehicular display apparatus in PTL 1 can be improved upon.

A display apparatus according to one aspect of the present disclosure is capable of improving upon the above related art.

A display apparatus according to one aspect of the present disclosure includes: a display device that displays an image; a concave mirror that reflects emission light toward outside of the display apparatus, the emission light being light that is emitted from the display device and represents the image; and a first mirror and a half mirror that are located on an optical path between the display device and the concave mirror, wherein the display device includes a first $\lambda/4$ plate that is located on a display surface of the display device and changes a phase of the emission light incident on the first $\lambda/4$ plate, the display surface being elongate, the half mirror includes a second $\lambda/4$ plate that changes a phase of the emission light incident on the second $\lambda/4$ plate, and a reflective polarizing plate that reflects a first polarized light component and transmits a second polarized light component different from the first polarized light component, the emission light emitted from the display surface is: (i) transmitted through the first $\lambda/4$ plate; (ii) reflected by the first mirror; (iii) transmitted through the second $\lambda/4$ plate included in the half mirror; (iv) reflected by the reflective polarizing plate included in the half mirror; (v) transmitted through the second $\lambda/4$ plate again as a result of being reflected by the reflective polarizing plate; (vi) reflected by the concave mirror; and (vii) transmitted through each of the second $\lambda/4$ plate and the reflective polarizing plate, and in a top view of the display apparatus, a line passing through a center of the display surface in a longitudinal direction and parallel to the longitudinal direction and a tangent line passing through a center of a reflection surface of the concave mirror in a longitudinal direction and parallel to the longitudinal direction intersect at a predetermined angle.

The display apparatus according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

The vehicular display apparatus described in PTL 1 which is related art is located to directly face the driver, and has a structure of showing a virtual image reflected by the concave mirror. In the case where the vehicular display apparatus described in PTL 1 is installed near the conventional rear-view mirror position (the top of the windshield and near the center of the vehicle in the right-left direction), when outside light enters from the side window of the driver's seat, there is a possibility that a light ray reflected by the concave mirror is concentrated in front of the vehicular display apparatus and shown in the image (thus causing reflected glare).

A display apparatus according to one aspect of the present disclosure includes: a display device that displays an image; a concave mirror that reflects emission light toward outside of the display apparatus, the emission light being light that is emitted from the display device and represents the image; and a first mirror and a half mirror that are located on an optical path between the display device and the concave mirror, wherein the display device includes a first $\lambda/4$ plate that is located on a display surface of the display device and changes a phase of the emission light incident on the first $\lambda/4$ plate, the display surface being elongate, the half mirror includes a second $\lambda/4$ plate that changes a phase of the emission light incident on the second $\lambda/4$ plate, and a reflective polarizing plate that reflects a first polarized light component and transmits a second polarized light component different from the first polarized light component, the emission light emitted from the display surface is: (i) transmitted through the first λ/4 plate; (ii) reflected by the first mirror; (iii) transmitted through the second λ/4 plate included in the half mirror; (iv) reflected by the reflective polarizing plate included in the half mirror; (v) transmitted through the second λ/4 plate again as a result of being reflected by the reflective polarizing plate; (vi) reflected by the concave mirror; and (vii) transmitted through each of the second λ/4 plate and the reflective polarizing plate, and in a top view of the display apparatus, a line passing through a center of the display surface in a longitudinal direction and parallel to the longitudinal direction and a tangent line passing through a center of a reflection surface of the concave mirror in a longitudinal direction and parallel to the longitudinal direction intersect at a predetermined angle.

Thus, the display apparatus can prevent reflected glare caused by outside light incident on the display apparatus.

In a top view of the display apparatus, the concave mirror may be provided with a reflection angle of reflecting in a direction different from emission light (light ray) incident on the concave mirror. Hence, outside light incident on the display apparatus from the side window of the driver's seat can be reflected to a position different from the position of the driver, so that reflected glare caused by the outside light can be prevented.

For example, the concave mirror may have an up-down and right-left rotation mechanism.

Thus, the emission direction of the reflected image of the display device from the display apparatus can be changed. This enables the driver to adjust the field of view depending on his or her viewpoint position.

For example, in the top view of the display apparatus, a tangent line extending in a longitudinal direction of the first mirror and a tangent line extending in a longitudinal direction of the half mirror are approximately parallel to a line that divides the predetermined angle in half.

Thus, the optical path length until the emission light emitted from the display surface of the display device is reflected by the concave mirror can be made approximately equal, with it being possible to suppress image distortion in the width direction of the display apparatus.

For example, the predetermined angle is 4° to 45°.

Thus, the depth in the housing of the display apparatus in the vehicle front-back direction when aiming the housing of the display apparatus in a direction in which the display surface of the display apparatus is visible to the driver can be reduced.

Embodiments will be described in detail below, with reference to the drawings.

The embodiments described below each show a general and specific example. The numerical values, shapes, materials, structural elements, the arrangement and connection of the structural elements, etc. shown in the following embodiments are mere examples, and do not limit the scope of the present disclosure. Of the structural elements in the embodiments described below, the structural elements not recited in any one of the independent claims are described as optional structural elements.

Embodiment 1

[1-1. Overview of Display Apparatus]

Figure 1:
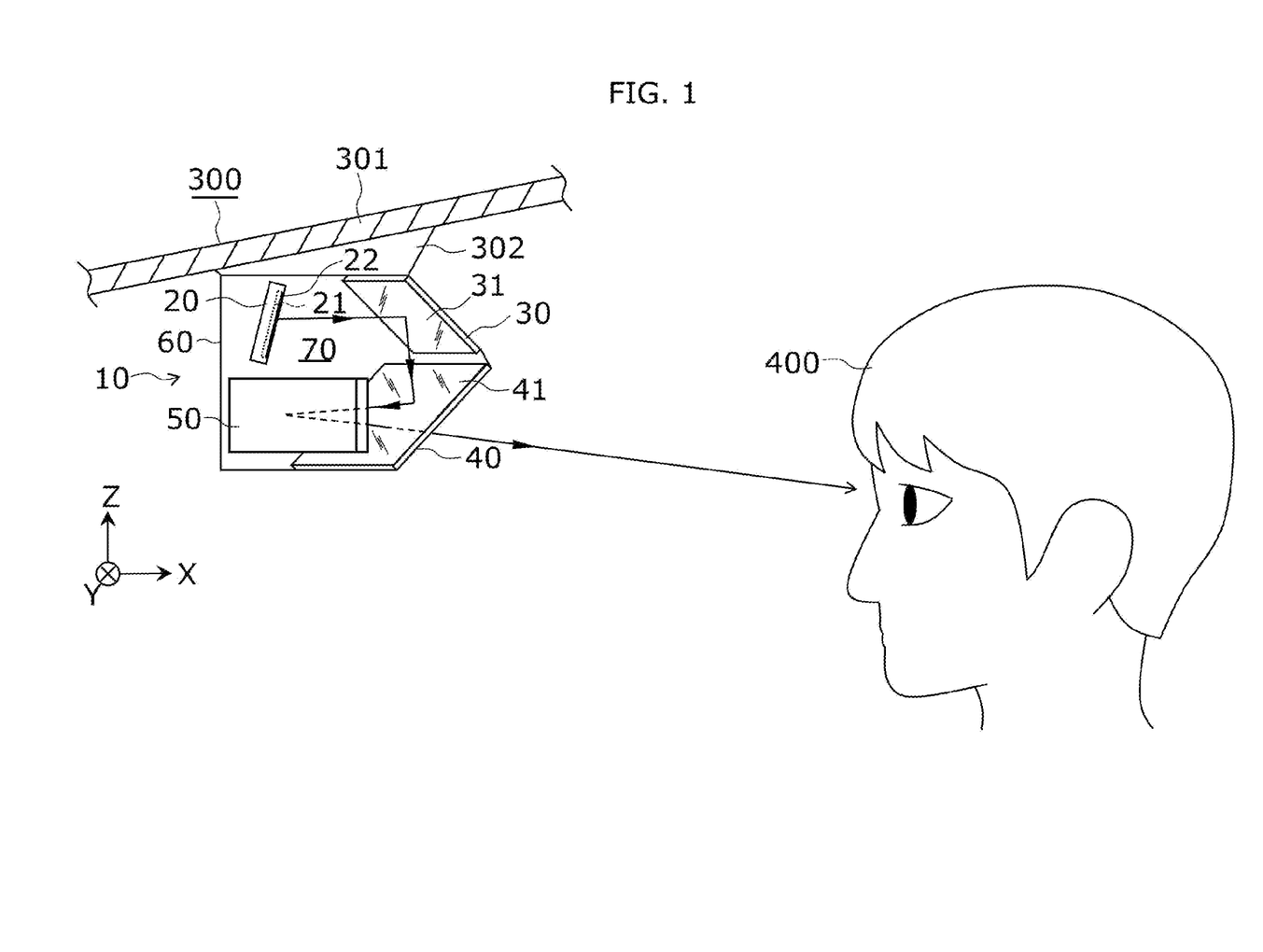
FIG. 1 is a schematic diagram illustrating a display apparatus according to Embodiment 1 located in a mobile body and its positional relationship with a driver.

An overview of display apparatus 10 according to Embodiment 1 will be given below, with reference to FIG. 1. Although Embodiment 1 describes the case where display apparatus 10 is configured to be installed in a right-hand drive vehicle, the below-described structure of display apparatus 10 may be right-and-left reversed as seen from the driver 400 side to support for a left-hand drive vehicle. FIG. 1 is a schematic diagram illustrating display apparatus 10 according to Embodiment 1 located in vehicle 300 (mobile body) and its positional relationship with driver 400.

As illustrated in FIG. 1, display apparatus 10 is attached to ceiling 301 near the windshield, via bracket 302. Display apparatus 10 is thus located in sight of driver 400 in a state in which driver 400 faces forward.

In the following description, the direction of forward movement of vehicle 300 is referred to as "forward" ("front"), and the direction of backward movement of vehicle 300 is referred to as "back" ("rear"). In FIG. 1, the front-back direction (horizontal direction) of vehicle 300 is the X-axis direction, the right-left direction of vehicle 300 is the Y-axis direction, and the up-down direction (vertical direction) of vehicle 300 is the Z-axis direction. In FIG. 1, "forward" ("front") is the negative side of the X-axis, "back" ("rear") is the positive side of the X-axis, "upper" ("up") is the positive side of the Z-axis, and "lower" ("down") is the negative side of the Z-axis. In FIG. 1, "right" is the positive side of the Y-axis, and "left" is the negative side of the Y-axis. The same applies to the other drawings except for those in which the directions of X, Y, and Z are not designated.

In the embodiments described below, the expression "approximately parallel", etc. are used. For example, "approximately parallel" not only denotes being perfectly parallel, but also denotes being substantially parallel, allowing for an error of a small percentage. Moreover, "approximately parallel" denotes being parallel within a range in which the advantageous effects according to the present disclosure can be achieved. The same applies to the other expressions with "approximately".

Vehicle 300 is, for example, an automobile such as a passenger car, a bus, or a truck. A camera (not illustrated) for capturing the rear of vehicle 300 is mounted on the rear window, the rear bumper, the trunk lid, or the like of vehicle 300. Although this embodiment describes the case where display apparatus 10 is mounted in vehicle 300 as a mobile body, the presently disclosed techniques are not limited to such, and display apparatus 10 may be mounted in any of various mobile bodies such as a construction machine, an agricultural machine, a vessel, and aircraft.

Display apparatus 10 displays a second image based on a first image, which is displayed by display device 20. Specifically, display apparatus 10 is an electronic mirror that displays a rear image (first image) captured by the camera. The rear image is an image of the rear of vehicle 300 captured by the camera, and light (emission light) representing an image (second image) displayed by display device 20 is reflected and viewed by driver 400. That is, the image displayed by display device 20 is the second image based on the first image. By viewing the rear image displayed by display apparatus 10, driver 400 can recognize the rear of vehicle 300 shown in the rear image. Display apparatus 10 is thus used as a substitute for a conventional physical rear-view mirror that shows the rear of vehicle 300 using reflection of light.

[1-2. Structure of Display Apparatus]

Figure 2A:
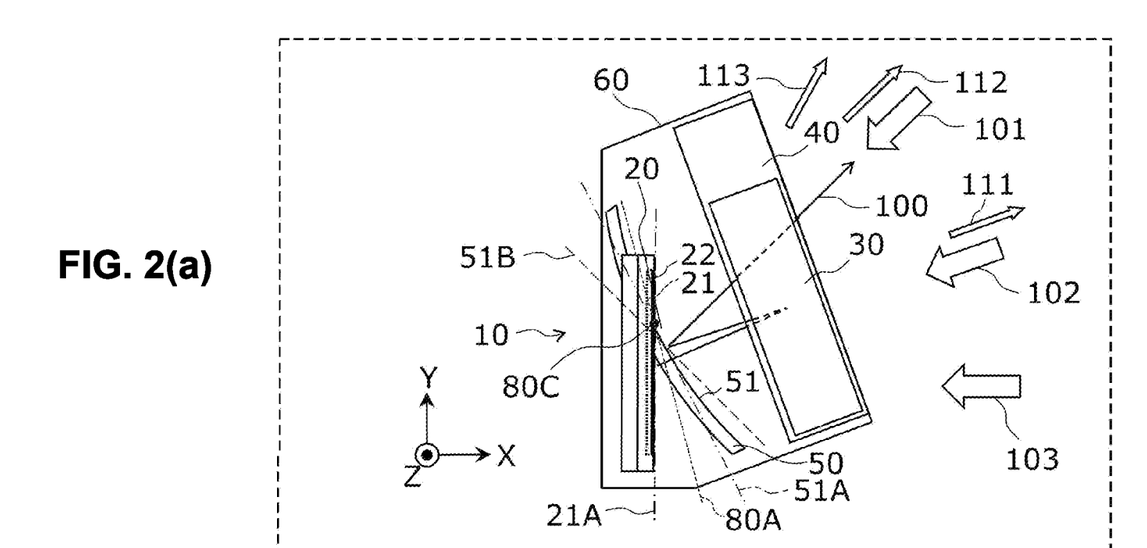
FIG. 2(a) is a schematic diagram illustrating the display apparatus according to Embodiment 1 in a top view.
Figure 2B:
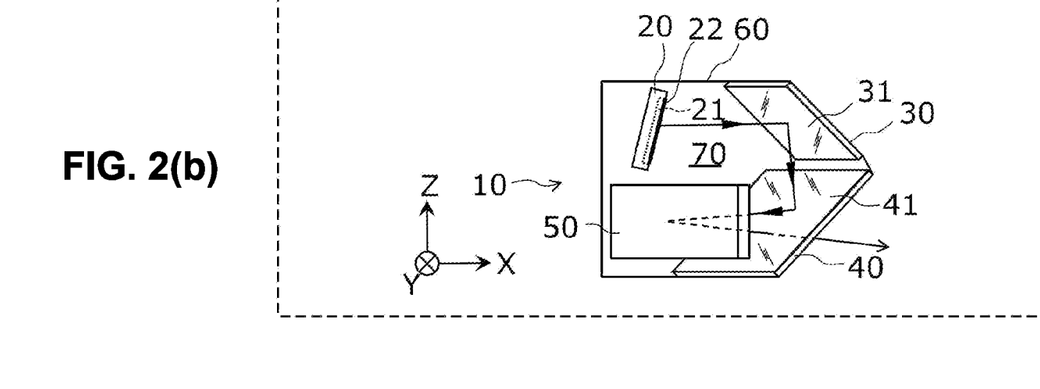
FIG. 2(b) is a schematic diagram illustrating the display apparatus according to Embodiment 1 in a side view.
Figure 3A:
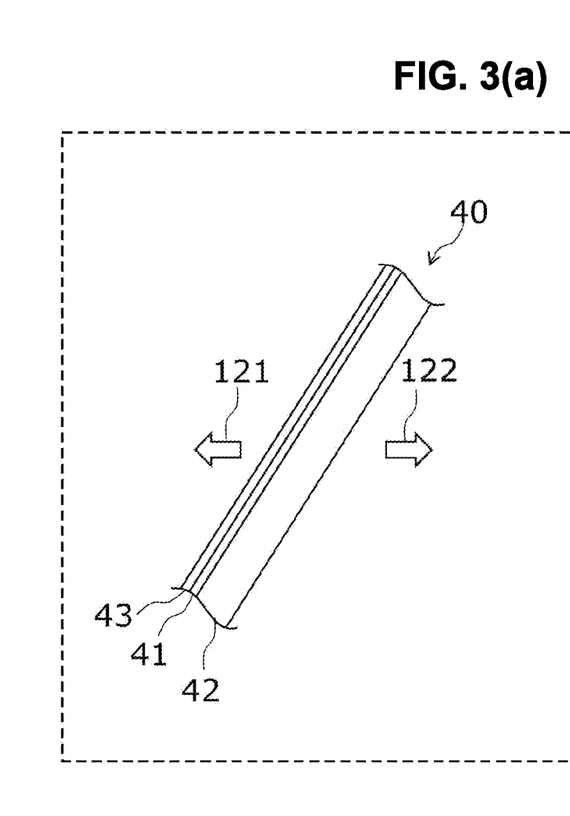
FIG. 3(a) is a diagram illustrating a first form of a half mirror included in the display apparatus according to Embodiment 1.
Figure 3B:
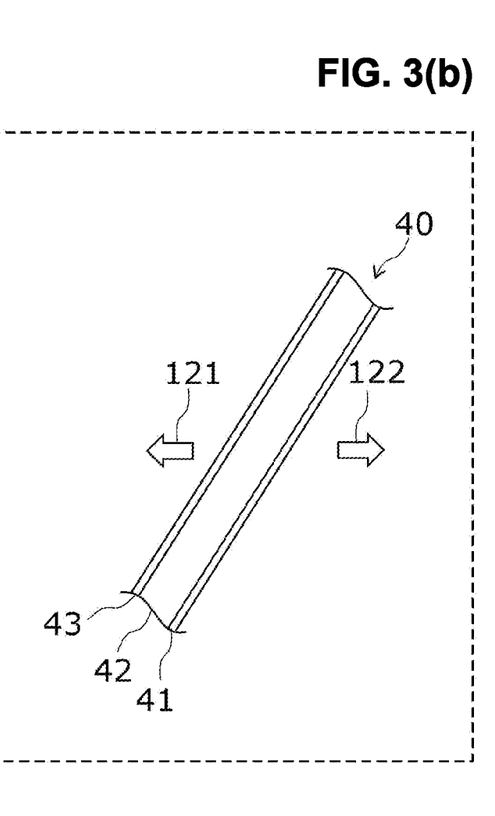
FIG. 3(b) is a diagram illustrating a second form of the half mirror included in the display apparatus according to Embodiment 1.

The structure of display apparatus 10 according to Embodiment 1 will be described below, with reference to FIG. 1, (a) and (b) in FIG. 2, and (a) and (b) in FIG. 3. (a) in FIG. 2 is a schematic diagram illustrating display apparatus 10 according to Embodiment 1 in a top view. (b) in FIG. 2 is a schematic diagram illustrating display apparatus 10 according to Embodiment 1 in a side view. (a) in FIG. 3 is a diagram illustrating a first form of half mirror 40 included in display apparatus 10 according to Embodiment 1. (b) in FIG. 3 is a diagram illustrating a second form of half mirror 40 included in display apparatus 10 according to Embodiment 1. First λ/4 plate 22 is provided on elongate display surface 21 of display device 20. In half mirror 40, second λ/4 plate 43 and reflective polarizing plate 41 are bonded to support substrate 42, as illustrated in (a) or (b) in FIG. 3. The term "plate" herein has a concept that includes not only a plate but also a member such as a film or a sheet.

Display apparatus 10 includes housing 60, display device 20, first mirror 30, half mirror 40, and concave mirror 50, as illustrated in (a) and (b) in FIG. 2.

Housing 60 is made of, for example, synthetic resin, and has storage space 70 inside. Display device 20, first mirror 30, half mirror 40, and concave mirror 50 are contained in storage space 70 of housing 60. Housing 60 is suspended from ceiling 301 of vehicle 300 via bracket 302, as illustrated in FIG. 1.

Display device 20 is a liquid crystal display (LCD) as an example, and displays images. Display device 20 has display surface 21 for displaying a rear image captured by the camera of vehicle 300. Display surface 21 has a horizontally long (elongate) rectangular shape, and has a greater dimension in the horizontal direction (e.g. the Y-axis direction) than in the vertical direction (e.g. the Z-axis direction). Display surface 21 emits light for forming the rear image, i.e. light (hereafter also referred to as "emission light") emitted from display surface 21 and representing the image. The emission direction of the light emitted from display surface 21 is inclined counterclockwise with respect to the direction of a perpendicular line to display surface 21, in a top view of display apparatus 10 in (a) in FIG. 2. First λ/4 plate 22 is located on the outermost surface of display surface 21. First λ/4 plate 22 is a retardation plate for converting light incident on first λ/4 plate 22 from linearly polarized light to circularly polarized light (or from circularly polarized light to linearly polarized light). First λ/4 plate 22 has a function of creating a phase difference of ¼ of wavelength λ (i.e. a phase difference of 90°) between linearly polarized light components orthogonal to each other in the light incident on first λ/4 plate 22. Since display device 20 is a liquid crystal display, the emission light emitted from display surface 21 is linearly polarized light. The emission light (light ray) emitted from display surface 21 of display device 20 is emitted toward first mirror 30 located behind (i.e. the positive side of the X-axis) display surface 21 in a side view.

First mirror 30 is a plane mirror, and has planar reflection surface 31. For example, first mirror 30 is formed by depositing a reflection metal film of aluminum or the like onto a surface of a substrate made of glass. First mirror 30 has a horizontally long rectangular shape, and has a greater dimension in the horizontal direction than in the vertical direction. First mirror 30 is located behind (i.e. the positive side of the X-axis) display surface 21 in a side view, and situated on the optical path between display device 20 and concave mirror 50. First mirror 30 is oriented to reflect the emission light from display surface 21 toward half mirror 40 located below (i.e. the negative side of the Z-axis) first mirror 30. The longitudinal direction of first mirror 30 is inclined counterclockwise with respect to the longitudinal direction of display surface 21 in a top view, and is nonparallel to the longitudinal direction of display surface 21. Although this embodiment describes first mirror 30 as a plane mirror as mentioned above, first mirror 30 may be a curved mirror having a spherical surface, an aspherical surface, or a free-form surface.

Half mirror 40 has the first form illustrated in (a) in FIG. 3 or the second form illustrated in (b) in FIG. 3. In the first form illustrated in (a) in FIG. 3, second λ/4 plate 43, reflective polarizing plate 41, and support substrate 42 are arranged in this order from the side on which the reflected light from first mirror 30 is incident. In the second form illustrated in (b) in FIG. 3, second λ/4 plate 43, support substrate 42, and reflective polarizing plate 41 are arranged in this order from the side on which the reflected light from first mirror 30 is incident. Second λ/4 plate 43 is a retardation plate that converts the light incident on second λ/4 plate 43 from linearly polarized light to circularly polarized light (or from circularly polarized light to linearly polarized light). Second λ/4 plate 43 has a function of creating a phase difference of ¼ of wavelength λ (i.e. a phase difference of 90°) between linearly polarized light components orthogonal to each other in the light incident on second λ/4 plate 43. Reflective polarizing plate 41 reflects a first polarized light component (linearly polarized light) and transmits a second polarized light component (linearly polarized light whose transmission axis is rotated 90° with respect to the linearly polarized light of the first polarized light component). Support substrate 42 is a transparent glass plate. Half mirror 40 has a horizontally long rectangular shape, and has a greater dimension in the horizontal direction than in the vertical direction. Half mirror 40 is below (i.e. the negative side of the Z-axis) first mirror 30 in a side view, and is located on the optical path between display device 20 and concave mirror 50, as illustrated in (b) in FIG. 2. Half mirror 40 is oriented to reflect the reflected light from first mirror 30 toward concave mirror 50 located in front of (i.e. the negative side of the X-axis) half mirror 40 in a side view. The longitudinal direction of half mirror 40 is parallel to the longitudinal direction of first mirror 30 in a top view, as illustrated in (a) in FIG. 2. As mentioned earlier, "parallel" not only denotes being perfectly parallel, but also denotes being substantially parallel, allowing for an error of a small percentage. Specifically, "parallel" refers to a state in which the angle (acute angle) between two straight lines is 0° or more and 5° or less.

Concave mirror 50 has reflection surface 51 that is a free-form surface. For example, concave mirror 50 is formed by depositing a reflection metal film of aluminum or the like onto a surface of a resin molded member. Concave mirror 50 has a horizontally long rectangular shape, and has a greater dimension in the horizontal direction than in the vertical direction. Concave mirror 50 is located in front of (i.e. the negative side of the X-axis) half mirror 40 in a side view, and is oriented to reflect the light ray reflected by half mirror 40 toward half mirror 40 located behind (i.e. the positive side of the X-axis) concave mirror 50 in a side view. Concave mirror 50 is provided with a reflection angle of reflecting in a direction different from the direction of the incident light ray, as illustrated in (a) in FIG. 2. Concave mirror 50 is oriented to reflect the light ray in the direction of driver 400. In other words, the longitudinal direction of concave mirror 50 is inclined counterclockwise with respect to the longitudinal direction of half mirror 40, and is nonparallel to the longitudinal direction of half mirror 40.

With the structure described above, in a top view of display apparatus 10, the longitudinal direction of display surface 21 is inclined clockwise with respect to the longitudinal direction of half mirror 40, and the longitudinal direction of concave mirror 50 is inclined counterclockwise with respect to the longitudinal direction of half mirror 40. In other words, in display apparatus 10, line 21A passing through the center of display surface 21 in the longitudinal direction and parallel to the longitudinal direction and tangent line 51A (a dashed-two dotted line in (a) in FIG. 2) passing through the center of reflection surface 51 of concave mirror 50 in the longitudinal direction and parallel to the longitudinal direction intersect at a predetermined angle, as illustrated in (a) in FIG. 2. The point at which line 21A and tangent line 51A intersect is intersection point 80C. Hence, the difference between the optical path length from the right end of display surface 21 in the longitudinal direction to the right end of concave mirror 50 in the longitudinal direction and the optical path length from the left end of display surface 21 in the longitudinal direction to the left end of concave mirror 50 in the longitudinal direction can be suppressed. Thus, a decrease in resolution and a variation in visual range of display video and a difference of distortion of display video between the right and left eyes can be prevented to thereby improve image quality. An angle with which image quality can be improved is therefore determined as the predetermined angle beforehand. The longitudinal direction of display device 20 and the longitudinal direction of concave mirror 50 may intersect outside their respective ranges. However, the longitudinal direction of display device 20 and the longitudinal direction of concave mirror 50 may intersect inside their respective ranges as illustrated in (a) in FIG. 2, with it being possible to reduce the size of display apparatus 10.

Regarding the positional relationship among display surface 21, first mirror 30, half mirror 40, and concave mirror 50 in a top view of display apparatus 10, a detailed structural example will be described below.

As mentioned above, in a top view of display apparatus 10, the longitudinal direction of display surface 21 is inclined clockwise with respect to the longitudinal direction of half mirror 40 (including first mirror 30), and the longitudinal direction of concave mirror 50 is inclined counterclockwise with respect to the longitudinal direction of half mirror 40. Moreover, a tangent line extending in the longitudinal direction of half mirror 40 is parallel to a tangent line extending in the longitudinal direction of first mirror 30. The detailed positional relationship is as follows: Line 21A of display surface 21 and tangent line 51A to reflection surface 51 of concave mirror 50 intersect at the predetermined angle, and line 80A that divides the predetermined angle in half is parallel to the tangent line extending in the longitudinal direction of half mirror 40 and the tangent line extending in the longitudinal direction of first mirror 30. Line 21A and line 80A are straight lines. In the structure in (a) in FIG. 2, line 80A has an angle of approximately 5° with respect to the tangent line extending in the longitudinal direction of half mirror 40 and the tangent line extending in the longitudinal direction of first mirror 30. This angle is within the definition of the term "parallel". With such a positional relationship, the optical path length until the emission light emitted from display surface 21 of display device 20 is reflected by concave mirror 50 is symmetric about intersection point 80C in (a) in FIG. 2 in a top view. Thus, the optical path length can be made approximately equal. This can suppress image distortion in the width direction of display apparatus 10.

[1-3. Operation and Effects of Display Apparatus]

The operation of display apparatus 10 according to Embodiment 1 will be described below, with reference to (a) and (b) in FIG. 2 and (a) and (b) in FIG. 3. (a) in FIG. 2 is a schematic diagram illustrating display apparatus 10 in a top view from the positive side of the Z-axis. (b) in FIG. 2 is a schematic diagram illustrating display apparatus 10 in a side view from the negative side of the Y-axis.

As illustrated in (b) in FIG. 2, a light ray of linearly polarized light emitted from display surface 21 of display device 20 is transmitted through first $\lambda/4$ plate 22 provided on display surface 21 to be converted to a light ray of circularly polarized light, and emitted toward first mirror 30.

The light ray of circularly polarized light incident on first mirror 30 is reflected by reflection surface 31 of first mirror 30, and is incident on half mirror 40.

Each of the case where half mirror 40 has the structure illustrated in (a) in FIG. 3 and the case where half mirror 40 has the structure illustrated in (b) in FIG. 3 will be described below. In (a) and (b) in FIG. 3, arrow 121 designates the direction to the inside of housing 60 illustrated in (a) and (b) in FIG. 2, and arrow 122 designates the direction to the outside of housing 60.

In the case where half mirror 40 has the first structure illustrated in (a) in FIG. 3, the light ray of circularly polarized light incident on second $\lambda/4$ plate 43 is transmitted through second $\lambda/4$ plate 43 to be converted to a light ray of linearly polarized light (first polarized light component), and is incident on reflective polarizing plate 41. The light ray of linearly polarized light incident on reflective polarizing plate 41 is reflected by reflective polarizing plate 41 that reflects the first polarized light component, and is incident on second $\lambda/4$ plate 43 again. The light ray of linearly polarized light incident on second $\lambda/4$ plate 43 is transmitted through second $\lambda/4$ plate 43 to be converted to a light ray of circularly polarized light, and emitted toward concave mirror 50.

In the case where half mirror 40 has the second structure illustrated in (b) in FIG. 3, the light ray of circularly polarized light incident on second $\lambda/4$ plate 43 is transmitted through second $\lambda/4$ plate 43 to be converted to a light ray of linearly polarized light (first polarized light component), and is incident on support substrate 42. The light ray of linearly polarized light transmitted through support substrate 42 is incident on reflective polarizing plate 41. The linearly polarized light incident on reflective polarizing plate 41 is reflected by reflective polarizing plate 41 that reflects the first polarized light component, and is incident on support substrate 42 again. The light ray of linearly polarized light transmitted through support substrate 42 is incident on second $\lambda/4$ plate 43 again. The light ray of linearly polarized light incident on second $\lambda/4$ plate 43 is transmitted through second $\lambda/4$ plate 43 to be converted to a light ray of circularly polarized light, and emitted toward concave mirror 50.

The light ray of circularly polarized light incident on concave mirror 50 is reflected by reflection surface 51 of concave mirror 50, and is incident on second $\lambda/4$ plate 43 in half mirror 40 again.

Each of the case where half mirror 40 has the structure illustrated in (a) in FIG. 3 and the case where half mirror 40 has the structure illustrated in (b) in FIG. 3 will be described below.

In the case where half mirror 40 has the first structure illustrated in (a) in FIG. 3, the light ray of circularly polarized light incident on second $\lambda/4$ plate 43 is transmitted through second $\lambda/4$ plate 43 to be converted to a light ray of linearly polarized light (second polarized light component), and is incident on reflective polarizing plate 41. The light ray of linearly polarized light incident on reflective polarizing plate 41 is transmitted through reflective polarizing plate 41 that transmits the second polarized light component, and is incident on support substrate 42. The light ray of linearly polarized light incident on support substrate 42 is transmitted through support substrate 42 and emitted toward driver 400, and is incident on the eyes of driver 400.

In the case where half mirror 40 has the second structure illustrated in (b) in FIG. 3, the light ray of circularly polarized light incident on second λ/4 plate 43 is transmitted through second λ/4 plate 43 to be converted to a light ray of linearly polarized light (second polarized light component), and is incident on support substrate 42. The light ray of linearly polarized light incident on support substrate 42 is transmitted through support substrate 42, and is incident on reflective polarizing plate 41. The light ray of linearly polarized light incident on reflective polarizing plate 41 is transmitted through reflective polarizing plate 41 that transmits the second polarized light component and emitted toward driver 400, and is incident on the eyes of driver 400.

As described above, emission light from display surface 21 of display device 20 is: (α) reflected by first mirror 30; (β) reflected by half mirror 40; (γ) reflected by concave mirror 50; and (δ) transmitted through half mirror 40. In detail, the emission light emitted from display surface 21 is: (i) transmitted through first λ/4 plate 22; (ii) reflected by first mirror 30; (iii) transmitted through second λ/4 plate 43 in half mirror 40; (iv) reflected by reflective polarizing plate 41 in half mirror 40; (v) transmitted through second λ/4 plate 43 again as a result of being reflected by reflective polarizing plate 41; (vi) reflected by concave mirror 50; and (vii) transmitted through each of second λ/4 plate 43 and reflective polarizing plate 41, before being incident on the eyes of driver 400. In other words, the emission light from display surface 21 of display device 20 is reflected three times in total inside housing 60, before being incident on the eyes of driver 400.

With the structure according to this embodiment, concave mirror 50 can be provided with a reflection angle of reflecting in a direction different from the direction of the incident light ray. Thus, outside light incident on display apparatus 10 from the side window of the driver's seat can be reflected toward a position different from the position of the driver, so that reflected glare caused by outside light can be prevented.

Moreover, when driver 400 views a rear image reflected by reflection surface 51 of concave mirror 50, it appears to driver 400 that a virtual image of the rear image is displayed at a display position forward from display apparatus 10 in vehicle 300. This contributes to a relatively small amount of focusing of the eyes in the case where driver 400, in a state of seeing the front of vehicle 300 through the windshield, transfers his or her gaze to the virtual image of the rear image.

[1-4. Operation Upon Incidence of Outside Light and Effects]

The behavior of the light ray in the case where outside light such as sunlight is incident on display apparatus 10 will be described below, with reference to (a) in FIG. 2 and (a) in FIG. 3. Outside light 101 is outside light incident from the side window of the driver's seat. Outside light 102 is outside light incident from the side window of the backseat. Outside light 103 is outside light incident from the rear window. In a top view of display apparatus 10 in (a) in FIG. 2, in the case where tangent line 51A passing through the center of reflection surface 51 of concave mirror 50 in the longitudinal direction and parallel to the longitudinal direction is in the state illustrated in (a) in FIG. 2, when outside light 101, outside light 102, and outside light 103 are incident on concave mirror 50 installed in display apparatus 10, outside light 101, outside light 102, outside light 103 are reflected by concave mirror 50, and reflected light 111, reflected light 112, and reflected light 113 are respectively emitted to the outside of display apparatus 10.

The behavior of outside light in the case of a conventional structure in which concave mirror 50 in display apparatus 10 directly faces driver 400 in a top view will be described below. In this case, the tangent line passing through the center of reflection surface 51 of concave mirror 50 in the longitudinal direction and parallel to the longitudinal direction is tangent line 51B designated by a dashed line in (a) in FIG. 2. Tangent line 51B is perpendicular to emission light 100. The direction of emission light 100 of display apparatus 10 is the direction of driver 400. Outside light 101 is a light ray that passes through the side window of the driver's seat and is incident from the immediate right side of driver 400.

The case where half mirror 40 has the structure illustrated in (a) in FIG. 3 will be described below. The polarization state of the light ray in the case where half mirror 40 has the structure illustrated in (b) in FIG. 3 is the same as that in the case where half mirror 40 has the structure illustrated in (a) in FIG. 3, and accordingly its description is omitted.

In the case where half mirror 40 has the first structure illustrated in (a) in FIG. 3, when outside light 101 in (a) in FIG. 2 passes through the immediate right side of driver 400 and is incident on display apparatus 10, outside light 101 is incident on support substrate 42 in half mirror 40. The light ray incident on support substrate 42 is transmitted through support substrate 42, and is incident on reflective polarizing plate 41. The unpolarized light ray incident on reflective polarizing plate 41 is transmitted through reflective polarizing plate 41 that transmits the second polarized light component, as a result of which only a light ray of linearly polarized light (second polarized light component) is transmitted. The light ray of linearly polarized light transmitted through reflective polarizing plate 41 is incident on second λ/4 plate 43. The light ray of linearly polarized light incident on second λ/4 plate 43 is transmitted through second λ/4 plate 43 to be converted to a light ray of circularly polarized light, and emitted toward concave mirror 50.

The light ray of circularly polarized light incident on concave mirror 50 is reflected by reflection surface 51 of concave mirror 50, and is incident on second λ/4 plate 43 in half mirror 40 again.

The light ray of circularly polarized light incident on second λ/4 plate 43 in half mirror 40 is transmitted through second λ/4 plate 43 to be converted to a light ray of linearly polarized light (first polarized light component), and is incident on reflective polarizing plate 41. The light ray of linearly polarized light incident on reflective polarizing plate 41 is not emitted to the outside of display apparatus 10 because reflective polarizing plate 41 reflects the first polarized light component. Thus, reflected glare caused by outside light can be prevented. Actually, however, a slight amount of light is emitted to the outside. The light emitted to the outside is due to the wavelength dispersion property of phase difference of second λ/4plate 43 and the extinction ratio property of reflective polarizing plate 41. A small percentage of the light ray is emitted to the outside of display apparatus 10 as reflected light 112 resulting in reflected glare. Accordingly, in the conventional structure in which concave mirror 50 in display apparatus 10 directly faces driver 400 in a top view, if outside light 101 and outside light traveling near outside light 101 are incident on display apparatus 10, reflected light 112 is emitted toward driver 400. Such reflected light 112 appears to driver 400 as unwanted reflected glare.

The behavior of outside light in this embodiment in which concave mirror 50 in display apparatus 10 does not directly face driver 400 in a top view will be described below. In this case, the tangent line passing through the center of reflection surface 51 of concave mirror 50 in the longitudinal direction and parallel to the longitudinal direction is tangent line 51A in (a) in FIG. 2.

The polarization behavior of the light ray incident on display apparatus 10 is the same as in the foregoing case where concave mirror 50 in display apparatus 10 directly faces driver 400.

In this embodiment in which concave mirror 50 in display apparatus 10 does not directly face driver 400 in a top view, if outside light 101 and outside light traveling near outside light 101 are incident on display apparatus 10, the light ray reflected by concave mirror 50 is emitted to the outside of display apparatus 10 as reflected light 111. Since concave mirror 50 does not directly face driver 400, reflected light 111 is a light ray emitted in a direction different from the direction of driver 400, and is hardly visible (i.e. substantially invisible) to driver 400.

If outside light 102 coming from the side window of the backseat and outside light traveling near outside light 102 are incident on display apparatus 10, the light ray reflected by reflection surface 51 of concave mirror 50 is emitted to the outside of display apparatus 10 as reflected light 112. Since reflected light 112 is a light ray emitted in the direction of driver 400, reflected light 112 appears to driver 400 as reflected glare. However, given that the side window of the backseat is typically made of tinted glass having low transmittance, the intensity can be considerably reduced as compared with the reflected glare of the outside light incident from the side window of the driver's seat. In addition, since the seat and headrest of the driver's seat are present between display apparatus 10 and the side window of the backseat, the outside light from the side window of the backseat is unlikely to enter display apparatus 10 as compared with the outside light from the side window of the driver's seat, and thus reflected glare can be prevented.

If outside light 103 coming from the rear window and outside light traveling near outside light 103 are incident on display apparatus 10, the light ray reflected by reflection surface 51 of concave mirror 50 is emitted to the outside of display apparatus 10 as reflected light 113. Reflected light 113 is a light ray emitted in a direction different from the direction of driver 400, and therefore is hardly visible to driver 400.

As described above, as a result of concave mirror 50 in display apparatus 10 not directly facing driver 400 in a top view, reflected glare caused by outside light can be prevented.

Figure 4:
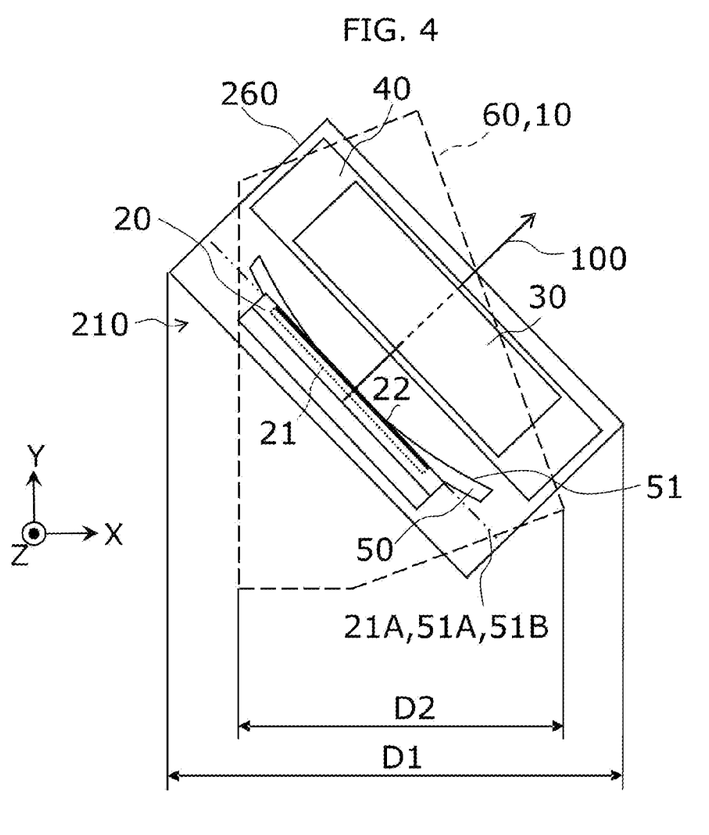
FIG. 4 is a schematic diagram for comparing the display apparatus according to Embodiment 1 and a display apparatus according to a comparative example.

The angle range of the predetermined angle will be described below, with reference to FIG. 4. FIG. 4 is a schematic diagram for comparing display apparatus 10 according to Embodiment 1 and display apparatus 210 according to a comparative example.

In the example illustrated in (a) in FIG. 2, the predetermined angle, i.e. the acute angle at which line 21A passing through the center of display surface 21 in the longitudinal direction and parallel to the longitudinal direction and tangent line 51A passing through the center of reflection surface 51 of concave mirror 50 in the longitudinal direction and parallel to the longitudinal direction intersect in a top view of display apparatus 10 is approximately 27°.

FIG. 4 illustrates display apparatus 210 according to the comparative example having a structure in which the predetermined angle is 0°, i.e. line 21A, tangent line 51A, and tangent line 51B match, and display apparatus 10 according to Embodiment 1 having the structure illustrated in (a) in FIG. 2. In display apparatus 210 according to the comparative example in FIG. 4, the same structural elements as those in (a) in FIG. 2 are given the same reference marks, and their detailed description is omitted. In display apparatus 210 according to the comparative example in FIG. 4, line 21A, tangent line 51A, and tangent line 51B match, so that display device 20 and concave mirror 50 face in the same direction (the direction of emission light 100). Thus, in the comparative example in FIG. 4, the distance between display device 20 and concave mirror 50 and the distance between first mirror 30 and half mirror 40 can be reduced, with it being possible to form display apparatus 210 with thinner housing 260.

To aim display surface 21 of display apparatus 210 in the direction of driver 400 in FIG. 1, however, the eyes of driver 400 need to directly face in the direction of the light ray reflected by concave mirror 50. Housing 260 is accordingly rotated counterclockwise about the Z-axis so that emission light 100 of display apparatus 210 is aimed at driver 400, as illustrated in FIG. 4. Consequently, the depth of housing 260 in the X-axis direction, i.e. the front-back direction of the vehicle, is distance D1 in FIG. 4.

In FIG. 4, the outline of housing 60 illustrated in (a) in FIG. 2 is designated by a long dashed line. The depth of housing 60 in the X-axis direction is distance D2 in FIG. 4. As illustrated in FIG. 4, distance D1>distance D2. The substantial depth of the display apparatus is thus smaller in (a) in FIG. 2. Therefore, the structure according to this embodiment achieves reduction in depth in the front-back direction of the vehicle.

The range of the predetermined angle for achieving reduction in depth in the front-back direction of the vehicle was calculated. Specifically, an optical simulation was actually conducted to enable driver 400 to easily view an image (second image) without discomfort under the condition satisfying distance D1>distance D2. As a result, the range of the predetermined angle was 4° to 45°. In detail, if the predetermined angle is less than 4°, the structure is closer to the structure of display apparatus 210 in FIG. 4, and distance D1>distance D2 is not satisfied. If the predetermined angle is more than 45°, driver 400 needs to move his or her head at a greater angle in order to view the image, and the visibility of display apparatus 10 to driver 400 is impaired. By limiting the predetermined angle to 4° to 45°, easily visible display apparatus 10 reduced in depth in the front-back direction of the vehicle can be provided. The range of the predetermined angle may be 6° to 30°, to achieve both size reduction and visibility at higher level.

Embodiment 2

[2-1. Structure and Operation of Display Apparatus]

Figure 5A:
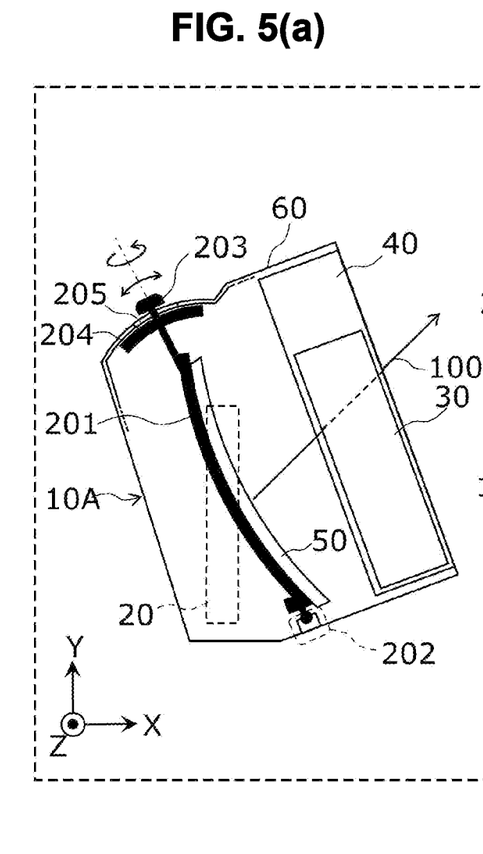
FIG. 5(a) is a diagram illustrating a display apparatus according to Embodiment 2.

The structure and operation of display apparatus 10A according to Embodiment 2 will be described below, with reference to (a) in FIG. 5. (a) in FIG. 5 is a sectional diagram of display apparatus 10A according to Embodiment 2. In the embodiment described below, the same structural elements as those in Embodiment 1 are given the same reference marks, and their description is omitted as appropriate. Embodiment 2 differs from Embodiment 1 in that concave mirror 50 has a mechanism (up-down and right-left rotation mechanism) capable of rotating from side to side and up and down.

As illustrated in (a) in FIG. 5, concave mirror 50 is fixed to holder 201. The left end of holder 201 as seen from driver 400 on the emission light 100 side is held by ball joint 202. The right end of holder 201 is provided with adjustment knob 203. To enable adjustment knob 203 to slide back and forth, opening 205 is formed at the side surface of housing 60. By moving adjustment knob 203 back and forth, the angle of concave mirror 50 in the right-left direction can be adjusted about the center of ball joint 202 as the rotation axis. Moreover, by rotating adjustment knob 203, the angle of concave mirror 50 in the up-down direction can be adjusted about the line connecting the center of ball joint 202 to the center of adjustment knob 203 as the rotation axis. Dustproof cover 204 is located at the position of adjustment knob 203 on the inner side of housing 60. Dustproof cover 204 is provided to prevent dust from entering housing 60 from opening 205 of housing 60 when adjustment knob 203 is moved back and forth. Although this embodiment describes the case where the adjustment of the angle of concave mirror 50 in the right-left direction and in the up-down direction is achieved using ball joint 202, a bearing structure other than ball joint 202 may be used.

Figure 5B:
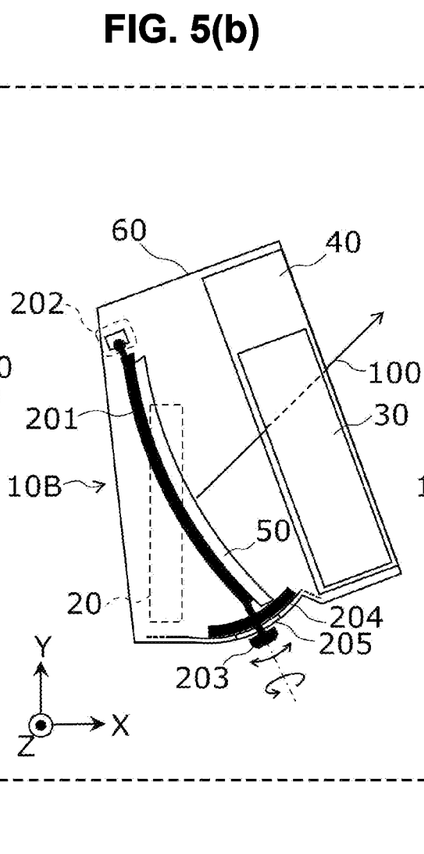
FIG. 5(b) is a diagram illustrating a display apparatus according to Variation 1 of Embodiment 2.
Figure 5C:
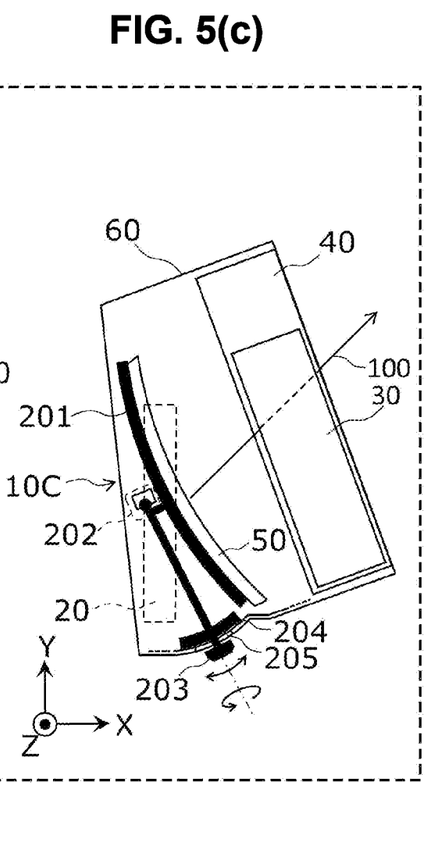
FIG. 5(c) is diagram illustrating a display apparatus according to Variation 2 of Embodiment 2.

The structure and operation of display apparatus 10B according to Variation 1 of Embodiment 2 and the structure and operation of display apparatus 10C according to Variation 2 of Embodiment 2 will be described below, with reference to (b) and (c) in FIG. 5 respectively. The same structural elements as those in Embodiment 2 are given the same reference marks, and their description is omitted as appropriate.

Display apparatus 10B according to Variation 1 has a structure in which ball joint 202 and adjustment knob 203 are interchanged in the Y-axis direction as compared with Embodiment 2 in (a) in FIG. 5. Thus, the angle of concave mirror 50 in the right-left direction and the angle of concave mirror 50 in the up-down direction can be adjusted respectively by sliding adjustment knob 203 back and forth and by rotating adjustment knob 203, as in display apparatus 10A.

Display apparatus 10C according to Variation 2 has a structure in which the position of ball joint 202 is changed from the left end of concave mirror 50 to a center part of concave mirror 50 as compared with Variation 1 in (b) in FIG. 5. The angle of concave mirror 50 in the right-left direction and the angle of concave mirror 50 in the up-down direction can be adjusted respectively by sliding adjustment knob 203 back and forth and by rotating adjustment knob 203, as in display apparatus 10B.

[2-2. Effects]

As a result of the angle of concave mirror 50 in the right-left direction and the angle of concave mirror 50 in the up-down direction being adjustable in Embodiment 2, Variation 1, and Variation 2, even in the case where the position of the viewpoint of driver 400 changes, driver 400 can make adjustment so that the display video is in sight. Further, as a result of the angle of concave mirror 50 in the right-left direction and the angle of concave mirror 50 in the up-down direction being adjustable by one adjustment knob 203, driver 400 can easily adjust the angle of concave mirror 50.

In Embodiment 2 illustrated in (a) in FIG. 5, a stroke region for sliding adjustment knob 203 in the front-back direction is secured. In Variation 1 illustrated in (b) in FIG. 5 and Variation 2 illustrated in (c) in FIG. 5, the stroke region for adjustment knob 203 can be provided in a dead space of display apparatus 10B and in a dead space of display apparatus 10C, respectively. Hence, an increase in size of each of display apparatuses 10A, 10B, and 10C can be suppressed.

In each of the structures illustrated in (a) to (c) in FIG. 5, the angle adjustment range of concave mirror 50 is within the foregoing range of the predetermined angle (the acute angle at which line 21A passing through the center of display surface 21 in the longitudinal direction and parallel to the longitudinal direction and tangent line 51A passing through the center of reflection surface 51 of concave mirror 50 in the longitudinal direction and parallel to the longitudinal direction intersect in a top view of each of display apparatuses 10A, 10B, and 10C). In other words, the angle of intersection between line 21A and tangent line 51A is in a range of 4° to 45° (and may be in a range of 6° to 30°), regardless of how the angle of concave mirror 50 is adjusted.

Other Examples

While a display apparatus according to one or more aspects has been described above by way of Embodiments 1 and 2 and Variations 1 and 2 of Embodiment 2, the present disclosure is not limited to the foregoing Embodiments 1 and 2 and Variations 1 and 2 of Embodiment 2. Other modifications obtained by applying various changes conceivable by a person skilled in the art to Embodiments 1 and 2 and Variations 1 and 2 of Embodiment 2 and any combinations of the structural elements in different embodiments without departing from the scope of the present disclosure are also included in the scope of one or more aspects.

Although each of the foregoing Embodiments 1 and 2 and Variations 1 and 2 of Embodiment 2 describes the case where half mirror 40 is composed of second $\lambda/4$ plate 43, reflective polarizing plate 41, and support substrate 42, a transmissive polarizing plate having a transmission axis in the same direction as the transmission axis of reflective polarizing plate 41 may be provided on the outermost surface (the driver 400 side) of half mirror 40. Reflective polarizing plate 41 mainly reflects a light ray whose intensity is half of incident light. Accordingly, a light ray incident from outside display apparatus 10, 10A, 10B, or 10C in a direction from below (i.e. the negative side of the Z-axis) may be reflected to the driver 400 side and cause reflected glare. By providing the transmissive polarizing plate on the outermost surface of half mirror 40, a light ray reflected by reflective polarizing plate 41 becomes a linearly polarized light component not transmitted through the transmissive polarizing plate. Thus, reflected light causing reflected glare can be reduced significantly.

Although each of the foregoing Embodiments 1 and 2 and Variations 1 and 2 of Embodiment 2 describes the case where half mirror 40 is composed of second $\lambda/4$ plate 43, reflective polarizing plate 41, and support substrate 42, a third $\lambda/4$ plate may be provided on the outermost surface (the driver 400 side) of half mirror 40. In each of the foregoing Embodiments 1 and 2 and Variations 1 and 2 of Embodiment 2, a light ray emitted from half mirror 40 is a light ray of linearly polarized light. In the case where driver 400 wears polarized sunglasses, if the transmission axis of the polarized sunglasses is orthogonal to or nearly orthogonal to the transmission axis of the light ray emitted from half mirror 40, display video may be not visible to driver 400 or may be extremely dark. As a result of providing the third $\lambda/4$ plate on the outermost surface of half mirror 40, the emitted light ray is circularly polarized light. Thus, even when driver 400 wears polarized sunglasses, display video is visible to driver 400, and is kept from being extremely dark.

Although each of the foregoing Embodiments 1 and 2 and Variations 1 and 2 of Embodiment 2 describes the case where half mirror 40 is composed of second $\lambda/4$ plate 43, reflective polarizing plate 41, and support substrate 42, an infrared cut filter may be provided on the outermost surface (the driver 400 side) of half mirror 40. In each of the foregoing Embodiments 1 and 2 and Variations 1 and 2 of Embodiment 2, when outside light is incident on display apparatus 10, 10A, 10B, or 10C, the incident light is reflected by reflection surface 51 of concave mirror 50, and a small percentage of the light ray is emitted to the outside of the display apparatus as reflected glare by the action of reflective polarizing plate 41 and second λ/4 plate 43. In the case where the outside light is sunlight, however, the outside light is focused at a focal point of concave mirror 50 by concave mirror 50. Therefore, even when the light is attenuated by half mirror 40, the temperature may increase at the focal point. By providing the infrared cut filter on the outermost surface of half mirror 40, even when sunlight is incident on display apparatus 10, 10A, 10B, or 10C and is focused at the focal point of concave mirror 50, the temperature increase at the focal point can be prevented.

These other examples relate to the structures of providing the transmissive polarizing plate, the third λ/4 plate, and the infrared cut filter. Such structures may be used in combination. For example, the transmissive polarizing plate, the third λ/4 plate, and the infrared cut filter may be arranged in this order from the emission side of half mirror 40. Alternatively, the transmissive polarizing plate, the infrared cut filter, and the third λ/4 plate may be arranged in this order from the emission side of half mirror 40.

While various embodiments have been described herein above, it is to be appreciated that various changes in form and detail may be made without departing from the spirit and scope of the present disclosure as presently or hereafter claimed.

Further Information About Technical Background to this Application

The disclosures of the following Japanese Patent Applications including specification, drawings and claims are incorporated herein by reference in their entirety: Japanese Patent Application No. 2020-083753 filed on May 12, 2020 and Japanese Patent Application No. 2020-187219 filed on Nov. 10, 2020.

INDUSTRIAL APPLICABILITY

A display apparatus according to the present disclosure can be used, for example, in an electronic mirror mounted in a vehicle.

The invention claimed is:
1. A display apparatus, comprising:
a display device that displays an image;
a concave mirror that reflects emission light toward outside of the display apparatus, the emission light being light that is emitted from the display device and represents the image; and
a first mirror and a half mirror that are located on an optical path between the display device and the concave mirror,
wherein the display device includes a first λ/4 plate that is located on a display surface of the display device and changes a phase of the emission light incident on the first λ/4 plate, the display surface being elongate,
the half mirror includes a second λ/4 plate that changes a phase of the emission light incident on the second λ/4 plate, and a reflective polarizing plate that reflects a first polarized light component and transmits a second polarized light component different from the first polarized light component,
the emission light emitted from the display surface is: (i) transmitted through the first λ/4 plate; (ii) reflected by the first mirror; (iii) transmitted through the second λ/4 plate included in the half mirror; (iv) reflected by the reflective polarizing plate included in the half mirror; (v) transmitted through the second λ/4 plate again as a result of being reflected by the reflective polarizing plate; (vi) reflected by the concave mirror; and (vii) transmitted through each of the second λ/4 plate and the reflective polarizing plate, and
in a top view of the display apparatus, a line passing through a center of the display surface in a longitudinal direction and parallel to the longitudinal direction and a tangent line passing through a center of a reflection surface of the concave mirror in a longitudinal direction and parallel to the longitudinal direction intersect at a predetermined angle.

2. The display apparatus according to claim 1,
wherein the concave mirror has an up-down and right-left rotation mechanism.

3. The display apparatus according to claim 1,
wherein in the top view of the display apparatus, a tangent line extending in a longitudinal direction of the first mirror and a tangent line extending in a longitudinal direction of the half mirror are approximately parallel to a line that divides the predetermined angle in half.

4. The display apparatus according to claim 1,
wherein the predetermined angle is 4° to 45°.

* * * * *